(12) United States Patent
Shemer et al.

(10) Patent No.: US 11,928,085 B2
(45) Date of Patent: Mar. 12, 2024

(54) USING MERKLE TREES IN ANY POINT IN TIME REPLICATION

(71) Applicant: EMC IP Holding Company LLC, Hopkinton, MA (US)

(72) Inventors: Jehuda Shemer, Kfar Saba (IL); Alex Solan, Hertzelia (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 215 days.

(21) Appl. No.: 16/713,146

(22) Filed: Dec. 13, 2019

(65) Prior Publication Data

US 2021/0182245 A1  Jun. 17, 2021

(51) Int. Cl.
| | | |
|---|---|---|
| *G06F 16/00* | (2019.01) | |
| *G06F 11/14* | (2006.01) | |
| *G06F 16/13* | (2019.01) | |
| *G06F 16/178* | (2019.01) | |
| *G06F 16/182* | (2019.01) | |
| *G06F 16/901* | (2019.01) | |

(52) U.S. Cl.
CPC ...... *G06F 16/1844* (2019.01); *G06F 11/1448* (2013.01); *G06F 16/137* (2019.01); *G06F 16/178* (2019.01); *G06F 16/9027* (2019.01)

(58) Field of Classification Search
CPC ............ G06F 16/1844; G06F 11/1448; G06F 16/137; G06F 16/178; G06F 16/9027; G06F 2201/835; G06F 16/184
See application file for complete search history.

(56) References Cited

U.S. PATENT DOCUMENTS

| | | |
|---|---|---|
| 6,529,917 B1 | 3/2003 | Zoltan |
| 7,437,601 B1 | 10/2008 | Manley et al. |
| 8,224,935 B1 | 7/2012 | Bandopadhyay et al. |
| 8,260,742 B2 | 9/2012 | Cognigni et al. |
| 8,345,707 B2 | 1/2013 | Stark et al. |
| 9,418,131 B1 | 8/2016 | Halevi et al. |
| 9,613,046 B1 | 4/2017 | Xu et al. |
| 10,095,428 B1 | 10/2018 | Meiri et al. |
| 10,250,679 B1 | 4/2019 | Natanzon et al. |
| 10,671,639 B1 | 6/2020 | Acheson et al. |
| 11,055,351 B1 | 7/2021 | Shyu et al. |

(Continued)

FOREIGN PATENT DOCUMENTS

DE  102011012444 A1  8/2012

OTHER PUBLICATIONS

DeCandia et al., Dynamo: Amazon's Highly Available Key-Value Store, SOSP '07, Oct. 14-17, 2007, retrieved on Apr. 11, 2022, retrieved from the internet <URL: https://www.allthingsdistributed.com/files/amazon-dynamo-sosp2007.pdf> (Year: 2007).*

(Continued)

*Primary Examiner* — Tyler J Torgrimson
(74) *Attorney, Agent, or Firm* — Workman Nydegger

(57) ABSTRACT

One example method includes performing various operations while a stream of IOs is being applied to a source dataset and replicated to a target dataset, and the operations include receiving a replicated IO that was previously applied to a source dataset Merkle tree, applying the replicated IO to a target dataset Merkle tree by entering an updated hash value in the target dataset Merkle tree, and applying a timestamp to the target dataset Merkle tree.

18 Claims, 6 Drawing Sheets

(56) References Cited

U.S. PATENT DOCUMENTS

| | | |
|---|---|---|
| 2003/0014432 A1 | 1/2003 | Teloh et al. |
| 2008/0250086 A1 | 10/2008 | Kisley |
| 2010/0198849 A1 | 8/2010 | Thomas et al. |
| 2010/0257149 A1 | 10/2010 | Cognigni et al. |
| 2010/0309933 A1 | 12/2010 | Stark et al. |
| 2014/0143205 A1 | 5/2014 | Leshchiner et al. |
| 2015/0242478 A1 | 8/2015 | Cantwell et al. |
| 2015/0277794 A1 | 10/2015 | Tudor et al. |
| 2016/0110261 A1 | 4/2016 | Parab et al. |
| 2016/0366094 A1 | 12/2016 | Mason et al. |
| 2017/0013058 A1 | 1/2017 | Annamalai et al. |
| 2017/0075938 A1 | 3/2017 | Black et al. |
| 2017/0111442 A1 | 4/2017 | Aronovich et al. |
| 2017/0300247 A1 | 10/2017 | Dewey et al. |
| 2018/0307709 A1 | 10/2018 | Xie et al. |
| 2019/0034507 A1 | 1/2019 | Duttagupta et al. |
| 2020/0007341 A1 | 1/2020 | Veeningen |

OTHER PUBLICATIONS

Oracle Database Online Documentation, 10g Release 2 (10.2), archived Nov. 27, 2011, retrieved on Apr. 12, 2022, retrieved from the Internet <URL: https://web.archive.org/web/20111127132008/ https://docs.oracle.com/cd/B19306_01/server.102/b14220/logical. htm> (Year: 2011).*

Bharatendra Boddu, Using Merkle trees to detect inconsistencies in data, Jul. 2, 2013, retrieved on Dec. 14, 2022, retrieved from the Internet <URL: http://distributeddatastore.blogspot.com/2013/07/ cassandra-using-merkle-trees-to-detect.html > (Year: 2013).

Marc Clifton, Understanding Merkle Trees, Mar. 13, 2017, retrieved on Dec. 14, 2022, retrieved from the internet <URL: https://www. codeproject.com/Articles/1176140/Understanding-Merkle-Trees-Why-Use-Them-Who-Uses-T > (Year: 2017).

* cited by examiner

USING MERKLE TREES IN ANY POINT IN TIME REPLICATION

RELATED APPLICATIONS

This application is related to U.S. patent application Ser. No. 16/713,734, entitled SELF HEALING FAST SYNC ANY POINT IN TIME REPLICATION SYSTEMS USING AUGMENTED MERKLE TREES, and filed on Dec. 13, 2019, which issued as U.S. Pat. No. 11,386,122 on Jul. 12, 2022. The aforementioned application is incorporated herein in its entirety by this reference.

FIELD OF THE INVENTION

Embodiments of the present invention generally relate to data synchronization in data replication, and other, applications. More particularly, at least some embodiments of the invention relate to systems, hardware, software, computer-readable media, and methods for using Merkle trees to provide for consistency checks and fast full synchronizations in connection with processes such as Any-Point-In-Time replication.

BACKGROUND

In data replication and backup systems, there is a need to ensure that the data at the target site, that is, where the replica or backup is stored, is synchronized with the data that is being backed up, that is, the source data. For example, when Input/Output (IO) operations, such as write, modify and delete, are issued with respect to the source data, such IOs may cause changes to the source data. Thus, the backup must then be updated to reflect the changes to the source data, that is, the backup data must be synchronized with the source data.

While some approaches have been devised for checking, and implementing, data synchronization, those approaches have not proven to be satisfactory, for various reasons. For example, data synchronization algorithms typically are employed with static data that does not change, or is not allowed to change, while synchronization is being checked and implemented. While this approach is convenient, it fails to account for the real world dynamic nature of the data. That is, data replication typically occurs on a live system in which the data is constantly changing. Thus, an algorithm designed for use with static data may not be effective in checking, or implementing, data synchronization in a dynamic continuous replication environment in which the data is constantly changing.

Another problem with typical data synchronization approaches is that they verify consistency, and then track every IO to make sure that the IO is kept. Any missed IOs, or even suspected missed IOs, will cause the initiation of a full sweep of the dataset to verify that all IOs are reflected in the target dataset. Thus, this approach is time-consuming, and resource intensive. Moreover, it may often be the case that a full sweep is not needed, since only small portions of the dataset may need to be synchronized.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
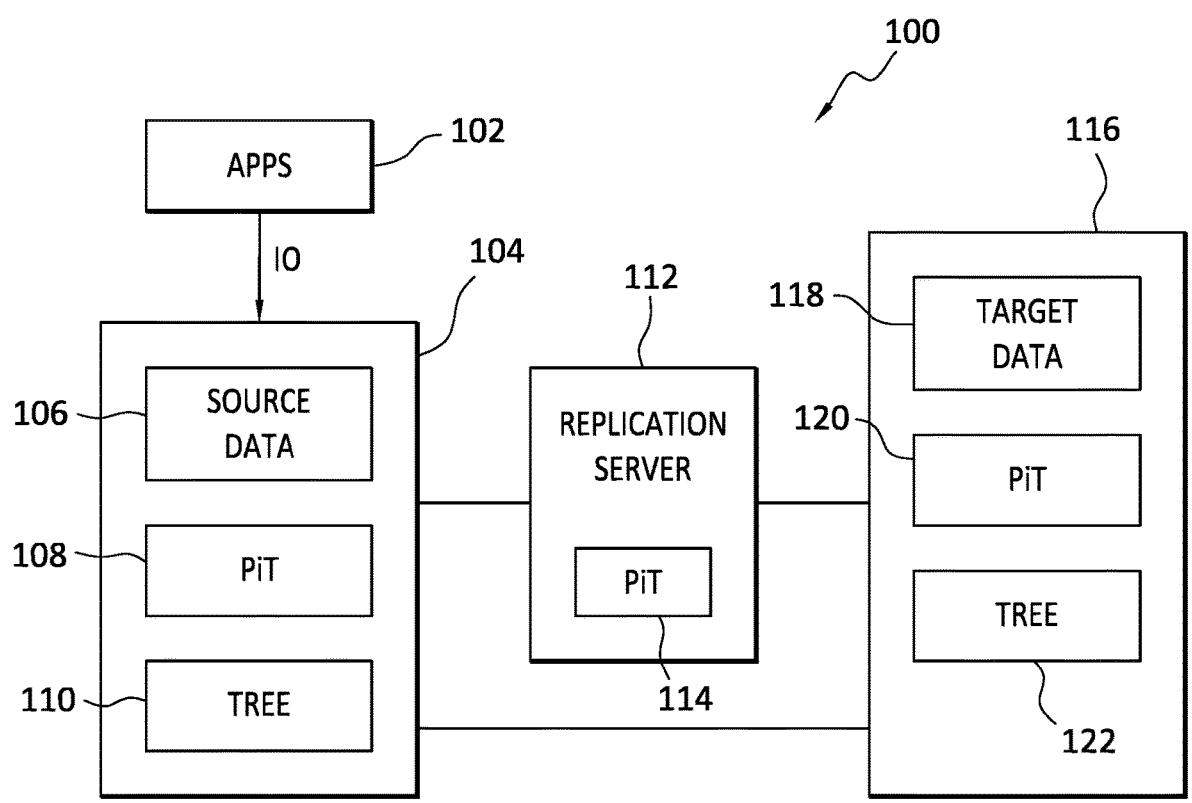
FIG. 1 discloses aspects of an example architecture.

Embodiments of the present invention generally relate to data synchronization in data replication, and other, applications. More particularly, at least some embodiments of the invention relate to systems, hardware, software, computer-readable media, and methods for using Merkle trees to provide for consistency checks and fast full synchronizations in connection with processes such as, for example, Any-Point-In-Time (PiT) replication.

In general, example embodiments of the invention involve the use of Merkle trees in processes such as any PiT replication, for example. More specifically, the use of Merkle trees in example embodiments may enable consistency checks and fast full synchronization, and/or partial synchronization, between source data and target data. Example embodiments embrace use cases in which the data that is being checked for consistency and/or synchronized, is dynamic, rather than static. That is, IOs may be issued to the source data during the time that consistency checks and/or synchronization are being performed. Embodiments of the invention may also implement consistency checks and/or synchronization in connection with static datasets, that is, datasets that are frozen and/or to which IOs are not issued during the consistency check and/or synchronization processes.

One example embodiment employs a particular way to use a modified Merkle tree in the context of an any PiT replication process. In this example embodiment, the source dataset and target dataset are each associated with a respective Merkle tree. The Merkle tree associated with the source dataset is updated with the incoming IOs, and the IOs may be tracked as they arrive at the source dataset. After the IOs have been performed with respect to the source dataset, hashes of the source dataset data affected by the IOs are sent to the target dataset and the target dataset is updated with the new hashes so that the content of the target dataset will be consistent with, that is, match, the content of the source dataset.

Next, a consistency determination may be made as between the source dataset and the target dataset in order to verify that the target dataset and source dataset are, in fact, consistent with each other at one, or more, points in time. The consistency determination, which generally involves a comparison between contents of the source data Merkle tree and contents of the target data Merkle tree, may be made for any specified PiT. As well, the consistency determination may be made with respect to static source data, and/or may be made in a working system with in-flight IOs, that is, the consistency determination between the datasets, and/or the synchronization between the datasets, may be performed at the same time as IOs are being issued to the source dataset that is being used in the consistency check and synchronization processes.

When an inconsistency between the source dataset and the target dataset is identified, such as while there are incoming IOs on the source data side, the datasets may be synchronized with each other, and the target Merkle tree and/or source Merkle tree updated accordingly. The possible causes for an inconsistency between a source dataset and target dataset may vary, but such inconsistencies may result from, for example, errors such as a missed IO, that is, an IO that was not written to one or the other of the source dataset or target dataset for some reason. In other cases, an inconsistency may simply reflect that fact that, for example, at a given point in time, the target dataset has not yet been updated to reflect an IO that was implemented in the source dataset.

The consistency checks and/or data synchronization may be implemented in connection with the use of an incrementing mechanism, such as a timestamp for example, to the source data Merkle tree and to the target data Merkle tree. That is, the timestamp mechanism assigns a timestamp to each node of the two Merkle trees, and the timestamps thus enable a determination to be made as to when the last update occurred to the corresponding node. These timestamps may be used to track and maintain the PiT stream by indicating the relative order in which events have occurred.

In this way, it is possible to determine what data was changed, and also when that data was changed relative to changes made to other data. As well, the timestamps enable data consistency, or a lack thereof, to be determined at any PiT. Once the inconsistency has been identified, then the dataset and corresponding Merkle tree holding the inconsistent data may then be synchronized with the other dataset and corresponding Merkle tree, respectively. It should be noted that either of the source dataset or the target dataset may be out of synch with the other of the source dataset and the target dataset although, in some circumstances, it may more commonly occur that it is the target dataset that includes the inconsistency and, as such, is out of synch with the source dataset.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that data consistency checks and/or synchronization between a source dataset and a target dataset may be performed at the same time as IOs are being issued to the source dataset and replicated to the target dataset. Thus, there is no need to freeze the source and/or target datasets to perform a consistency check, although such freezing may be performed in some embodiments. An advantageous aspect of an embodiment of the invention is that data consistency checks may be performed for any specified PiT. An advantageous aspect of an embodiment of the invention is that data synchronization may be implemented for any specified PiT. An embodiment of the invention may enable data consistency checks and/or data synchronization in a continuous replication environment. An embodiment of the invention may largely, or completely, eliminate the need to perform a full sweep of a dataset to identify all the changes that have been made to the dataset over a period of time.

A. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, any one or more of the disclosed operations. Such operations may include, but are not limited to, data read/write/delete operations, data deduplication operations, data backup operations, data restore operations, data cloning operations, data archiving operations, disaster recovery operations, data consistency checks, and data synchronization operations. More generally, the scope of the invention embraces any operating environment in which the disclosed concepts may be useful, including environments in which part or all of a source dataset is replicated to a target dataset.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

With particular attention now to FIG. 1, one example of an operating environment for embodiments of the invention is denoted generally at 100. In general, the operating environment 100 may include various applications 102, which may be hosted at one or more clients for example, that issue IOs, such as IOs to read, write, modify, and delete, data. The applications 102 may be any type of application including, but not limited to, applications such as word processors, spreadsheets, email applications, and database applications.

The IOs issued by the applications 102 may be directed to a client 104, which may, or may not, also host the applications 102. The client 104 may include a source dataset 106 to which the application 102 IOs are directed. The source dataset 106 may be located other than at the client 104. The client 104 may further include a Point-in-Time (PiT) module 108. Among other things, the PiT module 108 may operate to create and/or update a tree 110 to reflect changes to the source dataset 106 resulting from the application 102 IOs. The tree 110 may be updated in real time as the source dataset 106 is modified as a result of the IOs issued by the applications 102. In some embodiments, the tree 110 may take the form of a Merkle tree, but any other configuration or structure of comparable functionality may alternatively be employed.

The example operating environment 100 may further include a replication server 112 that may communicate with the client 104. In general, the replication server 112 may serve to replicate the source dataset 106 to one or more targets. In some embodiments, the replication of the source dataset 106 may be implemented as an ongoing, continuous, process. Additionally, or alternatively, the source dataset 106 may be replicated, such as by the replication server 112 for example, at one or more discrete points in time. In some embodiments, the replication server 112 may include a PiT module 114. In terms of its functionality, the PiT module 114 may be the same as the PiT module 108, with the IO information being communicated by the client 104 to the PiT module 114. In some embodiments, one or the other of the PiT modules 108 and 114 may be omitted.

With continued reference to FIG. 1, a data storage site 116 may also be provided in the example operating environment 100. The data storage site 116 need not have any particular configuration or location but may, in some embodiments, take the form of, or comprise, an on-premises cloud storage site or an off-premises cloud storage site. The data storage site 116 may communicate indirectly with the client 104 by way of the replication server 112 and/or directly with the client 104. In the latter case, the replication server 112 may be omitted, and the replication functionality performed at the data storage site 116, for example.

Among other things, the data storage site 116 may include a target dataset 118 to which the source dataset 106 is replicated. As disclosed elsewhere herein, the target dataset 118 may be updated, continuously in some embodiments, to reflect changes made to the source dataset 106 as a result of IOs issued by the applications 102. This updating of the target dataset 118 may be performed by any implementation of the PiT modules 108, 114, and 120. As well, any of the PiT modules 108, 114, and 120, may perform, and/or cause the performance of, a consistency check, and/or synchronization, as between the source dataset 106 and the target dataset 118. The consistency checks may be performed on an ongoing basis as IOs are directed to the source dataset 106, and/or may be performed at one or more discrete points in time.

The data storage site 116 may also include a tree 122 that is similar, or identical, in structure and function to the tree 110. In general, the tree 122 may be updated, such as by one of the PiT modules 114 or 120 for example, to reflect changes made to the target dataset 118. Each of the trees 110 and 122 may be stored together with the dataset to which it respectively corresponds, namely, the source dataset 106 and the target dataset 118. However, the trees 110 and 122 need not reside, or be hosted, at any particular location or by any particular entity. In one example embodiment, one or both of the trees 110 and 122 may reside at the replication server 112.

B. Basic Aspects of Some Example Trees

Figure 2:
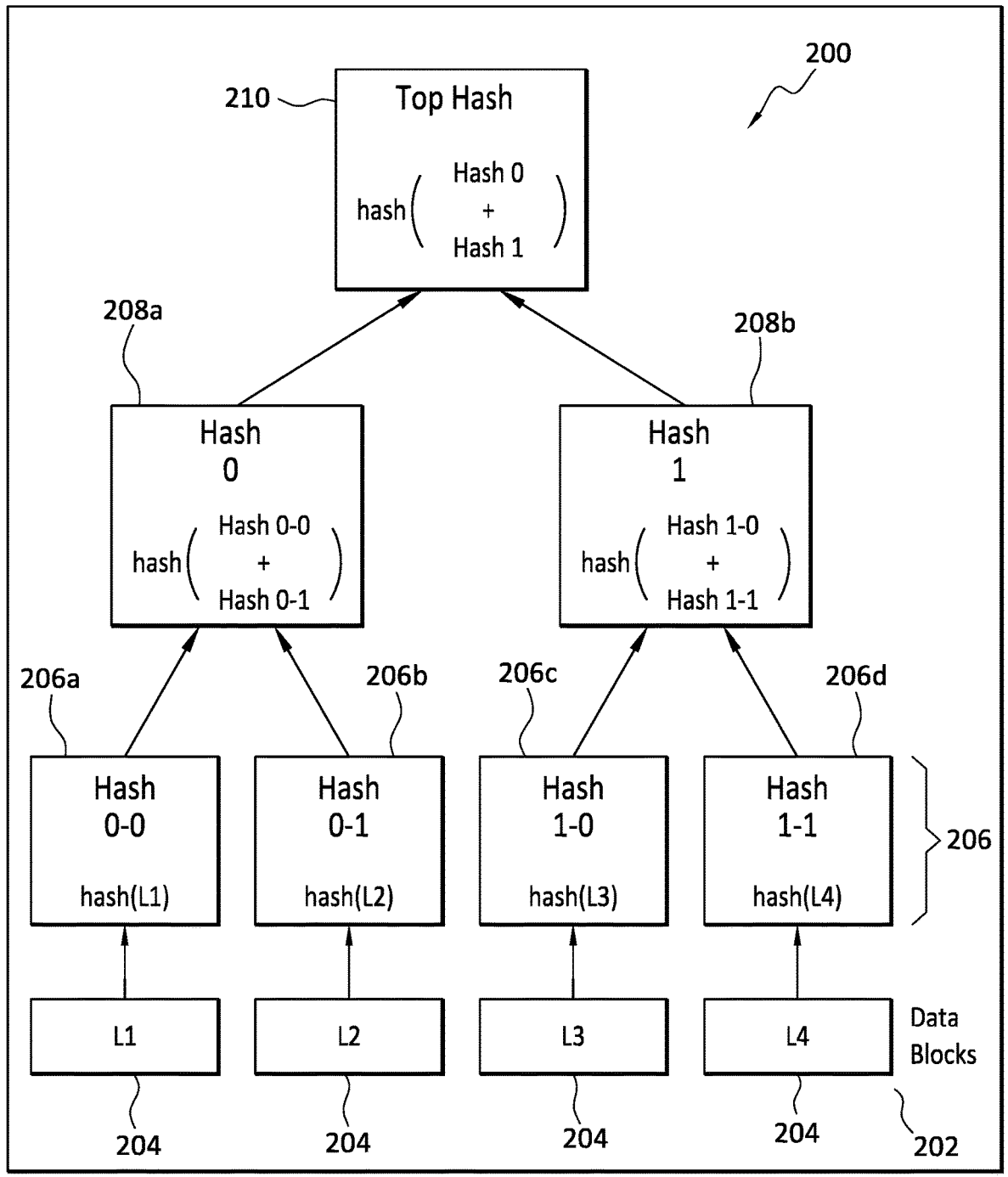
FIG. 2 discloses aspects of an example Merkle tree without timestamp information.

As noted above, some embodiments of the tree 110 and/or tree 122 take the form of a Merkle tree. Following, and with reference now to FIG. 2, is a brief discussion of an example Merkle tree structure, denoted generally at 200, which may be employed in some embodiments of the invention.

As shown in the example tree 200, a set 202 may include one or more data blocks 204, such as the data blocks 204 respectively denoted as L1, L2, L3 and L4, for example. The data blocks 204 need not be any particular size, and may be data that is added and/or modified, for example, in connection with IOs issued by an application, such as the applications 102. Each of the data blocks 204 may then be hashed with a hash function, such as SHA-1 for example, to produce a corresponding hash 206a, 206b, 206c, and 206d, respectively, that is analogous to a fingerprint of the data block 204 that was the basis for the hash. To illustrate, hashing the data block 204 denoted as L1, that is, performing the function 'hash (L1),' produces the hash 206a or 'Hash 0-0.' In this way, a unique respective hash is generated for each of the data blocks 204.

At the next level, or tier, of the tree 200, groups of two or more of the hashes 206 are hashed together to generate hashes 208a and 208b. Particularly, and as disclosed in FIG. 2, the hashes 206a and 206b are hashed together to generate the hash 208a or 'Hash 0,' and the hashes 206c and 206d are hashed together to generate the hash 208b or 'Hash 1.' Because the hashes 206a and 206b, for example, are each unique, the hash 208a is likewise unique. As well, because the hashes 206c and 206d, for example, are each unique, the hash 208b is likewise unique.

At the root level of the tree 200, a root hash 210 is created by hashing together the hashes 208a and 208b. The uniqueness of the hashes 208a and 208b ensures that the root hash 210 is unique as well, with respect to the set 202 of data blocks 204. Thus, if the root hash 210 matches the root hash of another set of data blocks, it can be concluded that both sets of data blocks are the same. On the other hand, if the root hash 210 does not match the root hash of another set of data blocks, it can be concluded that there are one or more differences between the two sets of blocks. In the following discussion, further details are provided concerning trees, such as the example tree 200.

C. Use of Some Example Trees for Consistency/Synchronization

Trees such as the examples disclosed herein may be used for data consistency checks and for data synchronization between datasets. With continued reference to the example of FIG. 2, details are provided concerning the updating of a Merkle tree. For example, if data of one of the blocks, such as the data block 204 designated L2, changes, then the hash (L2) must be calculated on the changed block. Correspondingly, all the hashes up the tree 200, from the hash 206a (Hash 0-0) to the root or Top Hash 210, also must be recalculated. Thus, for a disk with 'n' blocks, O(log n) hashes need to be updated for every change in a data block. As an example, a 1 TB disk has 2 billion blocks with a binary tree depth of 31. Thus, an update operation for that tree would requires 31 hash operations just to update the tree.

Attention is directed now to a brief explanation of some non-Merkle tree approaches to data synchronization that help to illustrate the usefulness of Merkle trees in data synchronization processes. By way of background, in replication and backup systems, there is always a process of a full synch of the source dataset and the target dataset. This may be performed, for example, when the system is built and there is a need to replicate the source dataset to a remote site which contains a fresh disk. Subsequent to this initial build out however, there are many situations within the lifecycle of a replication and backup, in which the target is largely similar to the source, with only a small percentage of area changed. For example, a normal daily change of a backup volume is typically a few percent of the overall disk size. In a replication process for example, only a few IOs may be missed due to some bad path flow or loss of synchronization. Following are some brief examples that illustrate some of these concepts.

Assume, for example, that there are two disks in distant locations that are desired to be synchronized so that they have the same data. A simple or nave approach to data synchronization in this case would be:
1. Read disk1
2. Read disk2
3. Send all disk1 data to location 2
4. Compare.

This approach would require sending all the data between locations, and would thus be wasteful both in terms of time, and in terms of computing resources.

A better approach might be:
1. Read disk1 and hash the data blocks
2. Read disk2 and hash the data blocks
3. Send disk 1 data hashes to location 2
4. Compare hashes and request the data only for the blocks that have different hashes In this case, we send only the hashes and the blocks that differ, which amounts to a much smaller amount of data to be sent. If the respective data on disks 1 and 2 are completely different, then all the data would have to be sent. However, if only some areas of data on disks 1 and 2 are different, this approach is a substantial improvement over an approach in which all the data is sent.

As illustrated in the following example, various benefits may be obtained through the use of Merkle trees. One such approach involving Merkle trees may be:
1. Read disk1 and create a Merkle tree 'Tree1' (source dataset)
2. Read disk2 and create a Merkle tree 'Tree2' (target dataset)
3. Traverse Tree' and Tree2 using the function below (pseudo code, run Tree2):

```
Function MerkleSync(node) {
    Hash1 = Get_hash_of_same_node_in_tree1
    If Hash 1 == node.hash
        Return; //Hashes match. Subtree matches. Done.
    //if we got to here there is a difference in the subtree
    If node.isLeaf
        Get_data_of_same_node_in_tree1
    else
        //recursively scan the children
        foreach child of node
            MerkleSync(child)
```

To trigger this function on Tree2, call MerkleSync(root2).

In this example, Tree1 and Tree2 are identical in structure, since the size of the disks must match. A benefit here is that only a subset of hashes needs to be transferred. That is, if only a specific area of the disk had changes, only hashes and blocks of that area in the subtree are transferred. Thus, the complexity involved with the initial building of the trees is subsequently rewarded by a significant reduction in data transfer that would be required for synchronization.

If the number of blocks that differ is relatively small, significant time savings may be realized. For example, the overall time to transfer changed data blocks is limited to 'log(n)*nDiffBlocks,' but usually will be much shorter, since there is no need to begin the traversal anew for each block that should be sent. Rather, a traversal is needed of only a partial binary tree with 'k' leaves, so that a better estimation of traversal time will be a 'k*log(k)' time. Following is an illustrative numerical example.

Suppose there is a 1 TB disk which must by synched and has 0.5% of blocks that differ. A nave approach to synchronization might involve sending 10¹² bytes over the network. If there is one signature, or hash, per block, that would require sending 10¹²/4096 (244M) signatures over the network.

In another approach, the hashes are all sent, but the only data sent is the data whose hashes have changed. Thus, 10¹² bytes with a 4K block size means 10^12/4K is ~244 M blocks which means 244M hashes×20 bytes per hash of data=~5 GB of data. Of these hashes, we know that 0.5% changed so it could be expected that there are 244M× 0.005=~1 M hashes to be different. We send the data only of those 1M blocks which is 1M×4 KB per block=~4 GB data. So the total sent is 5 GB+4 GB=9 GB total, as compare compared to 1 TB. This is a significant improvement.

It would be an even further improvement if all of the 244M hashes did not have to be sent. TO this end, a binary Merkle tree may be constructed where each data block is a leaf node in the tree for a total of 244M leaves. As a result, the depth of the tree is log(244 MB) where it is log base 2 which results in a depth of 28. Assume that for each block that changed, we need to send all the parents up to the root. Less may be needed however, as nodes with changes may have common parents. Thus, we have 1M changed blocks which corresponds to a worst case of 28*1M=28M hashes. Each hash is 20 bytes so 28M*20=560 MB of hashes to send. Total we have: 4 GB+0.56 GB=4.56 GB or about half the amount of the previous optimization in which about 9 GB would have to be sent.

C. Example Trees with Incrementation Information

It will be appreciated from this disclosure that Merkle trees employed in the manner described herein can provide useful results in certain circumstances, such as when the trees are frozen to any changes while synchronization is taking place. However, it is desirable in some circumstances to be able to be able to perform consistency checks and/or data synchronization during a continuous replication process in which IOs are streamed to a source dataset and replicated to a target dataset.

Figure 3:
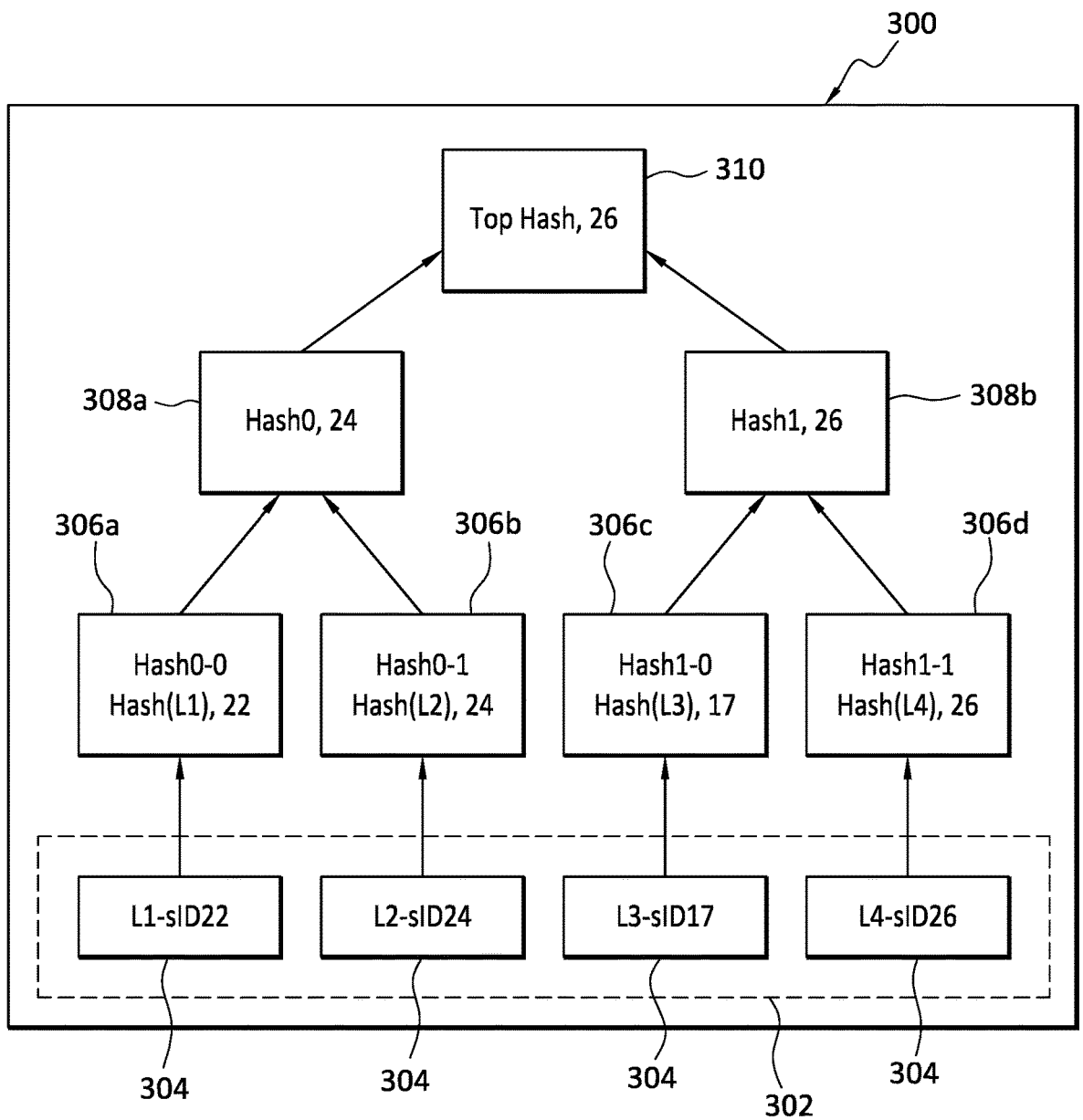
FIG. 3 discloses aspects of an example Merkle tree augmented with timestamp information.

Accordingly, attention is directed now to FIG. 3 which discloses an example of a tree 300, which may take the form of a Merkle tree, and which may be either a source dataset tree, or a target dataset tree. To facilitate the discussion, the tree 300 will be referred to as a target dataset tree 300, which may be similar to the tree 200 in that the example target dataset tree 300 may include a set 302 of data blocks 304, denoted as L1, L2, L3, and L4. Each of the data blocks 304 may be hashed, such as by way of a hash function Hash (L1) in the case of the L1 data block 304 for example, to produce a corresponding hash that is unique to the hashed data block 304. Thus, hashing of the L1, L2, L3 and L4 data blocks 304 results in the creation of, respectively, hashes 306a, 306b, 306c, and 306d. The next level of the target dataset tree 300 includes hashes 308a (Hash0) and 308b (Hash1) that are created by hashing, respectively, the groupings (Hash0-0, Hash0-1), and (Hash1-0, Hash1-1). Finally, a root hash 310 is generated by hashing the grouping (Hash®, Hash1). In this way, a target dataset tree 300 having four levels is defined, namely, one level of data blocks 304, two levels of hashes, and a fourth level having the root hash 310.

The example target dataset tree 300 may be referred to as a binary tree since after the initial hash of the data blocks 304, no more, or less, than 2 hashes are hashed together to produce a hash at the next level of the tree, as disclosed in FIG. 3. Note that the data blocks 304 and the hashes 306a-306d, 308a, 308b, and 310, may be referred to herein as nodes. Alternatively, and except for the root hash 310, each node may be referred to herein as a leaf of the target dataset tree 300.

With continued reference to FIG. 3, the example target dataset tree 300 is augmented with incrementation information which may take the form of timestamps, one of which is associated with each node of the tree. Two example timestamps are referred to in FIG. 3 as ' sID22' (L1 data block 304), and '22' (hash 306a), but any other suitable notation may be used. As apparent from these examples, the hash of a data block assumes the same timestamp as the data block itself since the hash is simply a fingerprint of that data block. On the other hand, for example, the hash 308a of the combination of the two hashes 306a and 306b assumes the newest of the respective timestamps associated with the hashes 306a (timestamp 22) and 306b (timestamp 24), namely timestamp 24.

Timestamps may be added to, or otherwise associated with, the nodes at the time that the hash or data of the node is updated. In some instances, multiple IOs are bundled together, such that more than one node may have the same timestamp. A tree that includes respective incrementation information for one or more nodes may be referred to herein as an augmented tree.

In terms of its form, a timestamp may be a clock time or real time, for example. As another example, the incrementation information may take the form of a versionID, or a snapshotID. More generally, the incrementation information may be generated by any mechanism that provides for incrementing values that enable identification of a relative temporal relationship between, or among, multiple events such as changes to a hash. Thus, while the discussion herein largely refers to timestamps, the timestamps are presented and discussed only by way of example, and not limitation.

With more particular reference to the augmentation of the tree, every update to a node of the target dataset tree 300 will mark the timestamp in the updated node. Each affected node will indicate the timestamp in the leaves, and any nodes that need recalculation in the target dataset tree 300. The data source may indicate to the target what snapshot is being worked on by, for example, communicating the timestamp ID to the target, or by appending the timestamp ID to replication IOs sent to the target. If the update of the target dataset tree 300 is treated as an atomic operation, after updating the target dataset tree 300, the root ends up being associated with the timestamp of the snapshot. Thus, in the case of the target dataset tree 300, the root hash 310 has timestamp 26. When the snapshot corresponding to that timestamp 26 is closed on the source side, the value of the root hash of the source dataset may be sent to the target, and/or stored in a way the target can retrieve it.

Among other things, the use of timestamps enables a determination to be made as to whether or not it is possible to perform a valid comparison between part, or all, of a source dataset tree and part, or all, of a target dataset tree. To briefly illustrate, if a timestamp of a node in the source dataset tree is different from a timestamp of the same node in the target dataset tree, then each of those two nodes is associated with a different respective point in time and, accordingly, the hashes or data respectively associated with those nodes cannot be compared for consistency with each other, or at least it cannot be assumed that the respective hashes/data are consistent with each other. On the other hand, when the node of the source dataset tree has the same timestamp as the corresponding node of the target dataset tree, for example, the respective data/hash of the two nodes can be compared for consistency with each other.

In FIG. 3, the target dataset tree 300 is shown as it exists/existed at a particular point in time, that is, the point in time (PiT) to which timestamp 26 corresponds. This can be seen with reference to the root hash 310, which has timestamp 26. From this information, it can be concluded that the most recent update to the target dataset tree 300 took place at the PiT corresponding to timestamp 26. Thus, if the target dataset tree 300 is the target dataset tree, and the source dataset tree also has timestamp 26, then the respective hashes of the two trees can be compared for consistency with each other since, for the same point in time, the status of each tree is known. Further, it may thus be concluded that all of the IOs applied to the source dataset have also been applied in the same way to the target dataset.

On the other hand, if the source dataset tree has a timestamp other than 26, such as timestamp 28 for example, even though the status of each tree is known, the respective statuses of the trees correspond to different points in time. That is, as of timestamp 28, there may be one or more IOs that have been applied to the source dataset, but which have not yet been applied to the target dataset. Thus, the respective root hashes of the trees are different, and it may be concluded that one or more respective hashes of the trees are not the same as each other such that a comparison of the respective hashes may not be useful in identifying any inconsistencies between, or among, those hashes. In such a case, the target dataset may be compared only with the portion of the source dataset that has a timestamp that is the root hash timestamp of the target dataset.

C. Consistency Checks and Comparisons

With continued reference to FIG. 3, further details are provided concerning some example processes. An important and basic question in replication systems and processes is to understand whether the source data and replica data are the same. In backup systems, it may be relatively easier to make this determination, since it may be the case that a concrete snapshot exists that represents the state of data at a given time, and it is known how to compare that snapshot to the source from which the snapshot was taken, since all the writes done after the time of the snapshot may be marked.

An any PiT replication process is more complex since two different processes are occurring simultaneously or at least overlapping, namely, IOs are being applied to the source dataset at the same time as the source dataset is being replicated to the target dataset. Thus, for a given point in time, if the root hash of the source dataset tree matches the root hash of the target dataset tree, it can be concluded that, at that point in time, the two datasets are consistent with each other, that is, they are the same. On the other hand, if the root hashes do not match, then the two datasets are not consistent with each other and may require synchronization. Note that while the datasets may be consistent with each other as of a particular point in time, they are not necessarily consistent with each other at another point in time.

As noted herein, the timestamp, snapshot ID, or other incrementation information, can be used to determine the time associated with a hash to make sure that correct hashes, that is, hashes with the same timestamp, are compared. For example, if the sID+root hash are the same for the source tree and the target tree, then it can be concluded that the target dataset is consistent with the source dataset. On the other hand, if the sID+root hash are not the same, the target dataset may, or may not, be consistent with the source dataset. In this latter case where the sID+root hash are not the same, the comparison between datasets may be delayed until the target dataset is updated to the same point in time as the source dataset.

To briefly summarize then, two primary elements may be involved when comparing source and target datasets in an ongoing replication process. First, it may be confirmed that the PiT for which the comparison is desired to be made is the same in the source dataset and the target dataset at the time of the test, that is, that the root hashes of those datasets have the same timestamp. The following example is illustrative.

With continued reference to FIG. 3, it can be seen that the left hand side of the target dataset tree 300 (hash 308a and below) has a timestamp of 24, while the right hand side of the target dataset tree 300 (hash 308b and below) has a timestamp of 26. Thus, the latest changes to the nodes on the left hand side of the target dataset tree 300 are from a point in time, 24, that is older than the point in time, 26, of the latest changes to the nodes on the right hand side of the target dataset tree 300. Moreover, any nodes on the right hand side with a timestamp 24, such as the L3 data block 304 and corresponding hash 306c, are up to date, relative to the left hand side of the tree which, as noted, has a timestamp of 24.

Suppose now that there is a need to check the consistency of the source dataset with the target dataset as of timestamp 25. In order to do this, it is first determined that the respective root hashes of both datasets have a timestamp of 25, otherwise, the consistency check may not be useful. If the root hashes do not match, then it may be concluded that there are one or more inconsistencies between the two datasets, and one or more leaves of the source dataset and target dataset must be examined and compared.

With particular reference to the example of FIG. 3, since the right hand side of the target dataset tree 300 has a timestamp of 26, as evidenced by the hash 308b, that portion of the target dataset tree 300 cannot be evaluated yet because the changes to the nodes associated with timestamp 26 occurred after the changes associated with the timestamp of interest, that is, timestamp 25. Thus, for the timestamp 25 check, the hashes on the right hand side of the target dataset tree 300 may be ignored, and only the hashes on the left hand side of the target dataset tree 300 may be used in the timestamp 25 check, since the hashes on the left hand side all have a timestamp that is 25.

As demonstrated in the example of the timestamp 25 check, the target dataset tree 300 is only traversed, beginning at the root hash 310, to a depth that enables a determination as to whether or not a particular leaf has a timestamp that meets the criterion 25, such that the leaf may therefore be compared to the source dataset at timestamp 25. Thus, in this illustrative example, the first leaf on the left (hash 308a) is noted as having a timestamp of 24, which meets the criterion, while the first leaf on the right (hash 308b) is noted as having a timestamp of 26, which exceeds the criterion. In both cases, no further traversal of the target dataset tree 300 is needed since the newest hash on the left side is 24, while the newest hash on the right side is 26. In this way, the target dataset tree 300 is only traversed to the extent necessary, and there is no need to traverse the entire target dataset tree 300.

Moreover, and with respect to the comparison process, if the hash 308a value matches the value of the corresponding hash, or node, in the source dataset tree, it may be concluded that all the leaves below the hash 308a likewise match with their counterparts in the source dataset tree. On the other hand, if the hash 308a value does not match the value of the corresponding hash, or node, in the source dataset tree, then the target dataset tree must be traversed further and additional comparisons with the source dataset tree performed until the inconsistency is identified.

In the aforementioned illustrative example then, all of the hashes in the target dataset tree 300 except those with a timestamp >25 are eligible for comparison with the corresponding hashes of the source dataset tree. Prior to a subsequent compare iteration however, the target dataset tree 300 will have been updated to reflect new IOs, at which point the hashes with the timestamp 26 are no longer the newest hashes in the target dataset tree 300 and, as such, are eligible for comparison when a consistency check is performed for timestamp 26 for example. At this point, there is no need to perform a check for timestamp 25, since that was done in the prior iteration.

Because the traversal of the target dataset tree 300 may be an ongoing, iterative, process, the target dataset tree 300 may be updated continuously as new IOs are directed to the source dataset and replicated to the target dataset. In this way, the target dataset and source dataset may be compared, by way of their respective trees, and updated as necessary, even while the data in both of the target dataset and source dataset is constantly changing due to the IOs that are being issued to the source dataset and replicated to the target dataset.

D. Example Algorithm

Following is a discussion of an example algorithm that uses Merkle trees to synchronize two datasets, such as a source dataset and a target dataset, by performing a consistency check and resolving any inconsistencies between the two datasets. In general, the algorithm may be employed to handle synchronization of the two datasets while IOs are being directed to the source dataset and replicated to the target dataset. The example algorithm assumes that a respective Merkle tree has already been built for each of the datasets. It is further assumed that the target side volume, where the target data itself is stored, is read-only for any other application beside the replication application. In the running of the algorithm, the following rules are observed: (1) traverse the target dataset tree in depth first search order—this correlates to a linear in order scan on the volume; and (2) IOs incoming to the source dataset will be used to update the source dataset tree, and the volume where the actual source data is stored, and the incoming IOs will also be transmitted, or replicated, to the target dataset, and the target volume and target dataset tree updated accordingly. Finally, the algorithm assumes that the source dataset and the target dataset are being compared with respect to the same point in time, that is, their root hashes have the same timestamp.

The algorithm, referred to as ImprovedMerkleSync(root2, current_snapid):

```
Function ImprovedMerkleSync(node, current_snapid) {
    Hash1 = Get_hash_of_same_node_in_tree1
    If Hash1 == node.hash
        Return; //Hashes match. Subtree matches. Done.
    //if we got to here there is a difference in the subtree
    If node.isLeaf
        If node.snapID<= current_snapid   //update only if older timestamp
            Get_data_of_same_node_in_tree1
    else
        //recursively scan the children
        foreach child of node
            ImprovedMerkleSync(child, current_snapid)
```

With respect to this algorithm, it is noted that the algorithm may run on 'Tree2,' that is the target dataset tree, for a specific timestamp, such as 'current_snapid' for example. Further, 'Tree1' in the algorithm refers to the source dataset tree at the same timestamp as Tree2. Note further that IOs coming in during the synch between the datasets may already known to be up to date and, as such, there may be no need to resend those. Rather, it may be enough to simply synch only the older IOs that do not match.

Once the traversal of the target dataset tree finishes and all the inflight IOs during the traversal have been sent from the source dataset to the target dataset, the snapshot of the source dataset can be closed and the timestamp incremented. The hash value at the root node at this point in time or timestamp is the hash of the closed snapshot. Once the last inflight IO reaches the target dataset, the hash in the root node of the target dataset tree should have the same value as the root hash of the source dataset tree. If, the timestamps of the source dataset tree and the target dataset tree match, but the root hashes of the two trees do not match, then further comparisons between the two trees may be performed to locate the inconsistency(ies).

E. Some Example Methods

Figure 4:
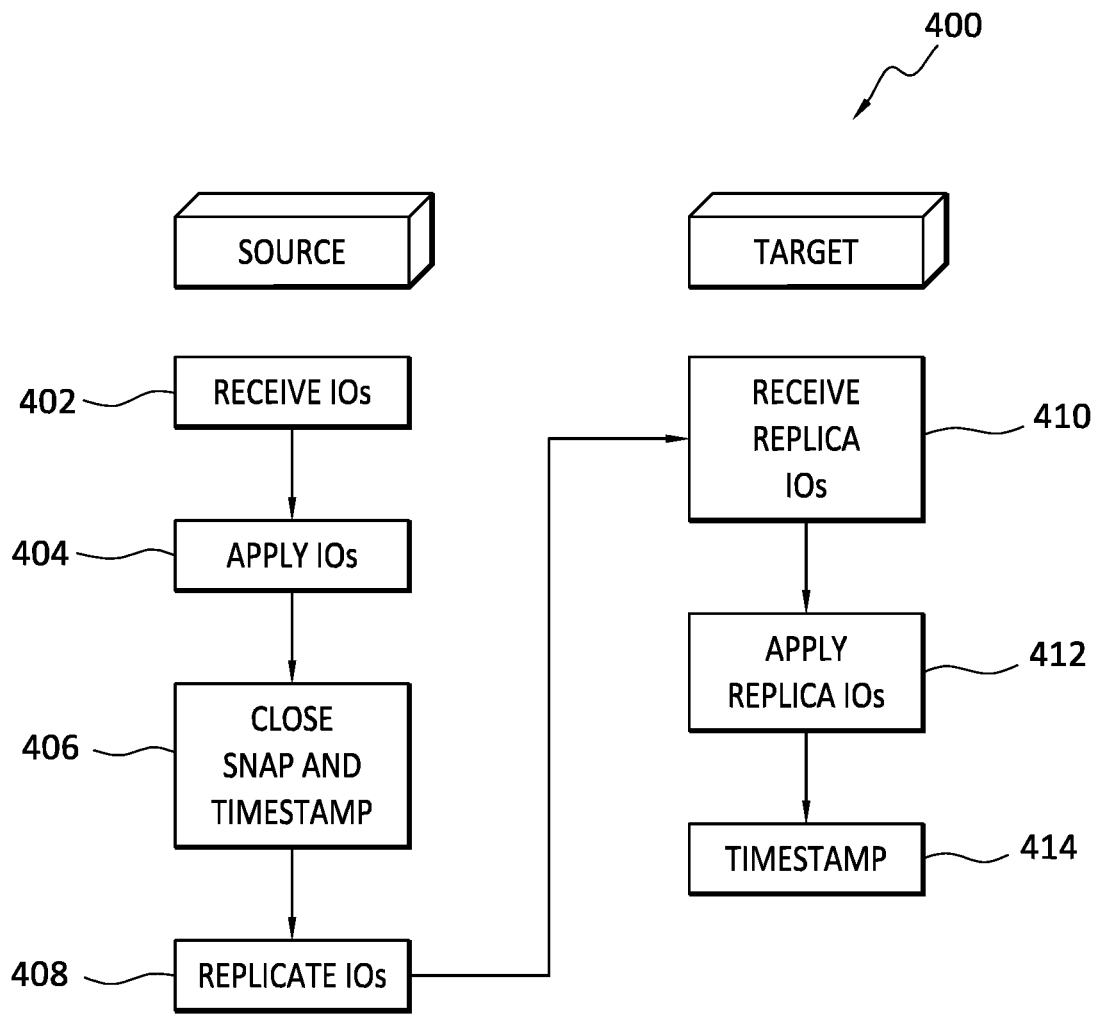
FIG. 4 discloses an example method for replication using Merkle trees and timestamp information.

With reference next to FIG. 4, details are provided concerning methods involving a source dataset tree and a target dataset tree, where the methods include updating, performing a consistency check, and synchronization. One example of a method for updating a source dataset tree and/or target dataset tree is denoted generally at 400.

The example method 400, which may be performed on a continuous basis, may begin when a source dataset receives 402 an IO, or stream of IOs, such as from an application for example. The IOs are then applied 404 to the source dataset, that is, the source volume is updated to reflect the IOs and one or more corresponding hashes of a source dataset tree, which may be a Merkle tree for example, are also updated to reflect the IOs. At some point in time (PiT), a snapshot is taken of the source dataset, and the snapshot is timestamped 406. The process 406 may comprise timestamping the source dataset tree. For example, the root hash of the source dataset tree may be stamped with the timestamp of the most recent change to the source dataset tree. Any, and all, hashes in the source dataset tree that were updated as a result of the application of the IOs are assigned the same timestamp.

Next, the IOs are replicated 408, such as in the form of updated hashes, and the replicated IOs are transmitted to the target dataset. The updated hashes may each include the timestamp that was assigned at 406. The replicated IOs are received 410 at the target dataset and applied 412. Application of the replicated IOs 412 may comprise both updating the volume that holds the target dataset, and also updating a target dataset tree with the timestamped hashes received from the source dataset. The target dataset tree may then be timestamped 414. For example, the root hash of the target dataset tree may be stamped with the timestamp of the most recent change to the target dataset tree.

Figure 5:
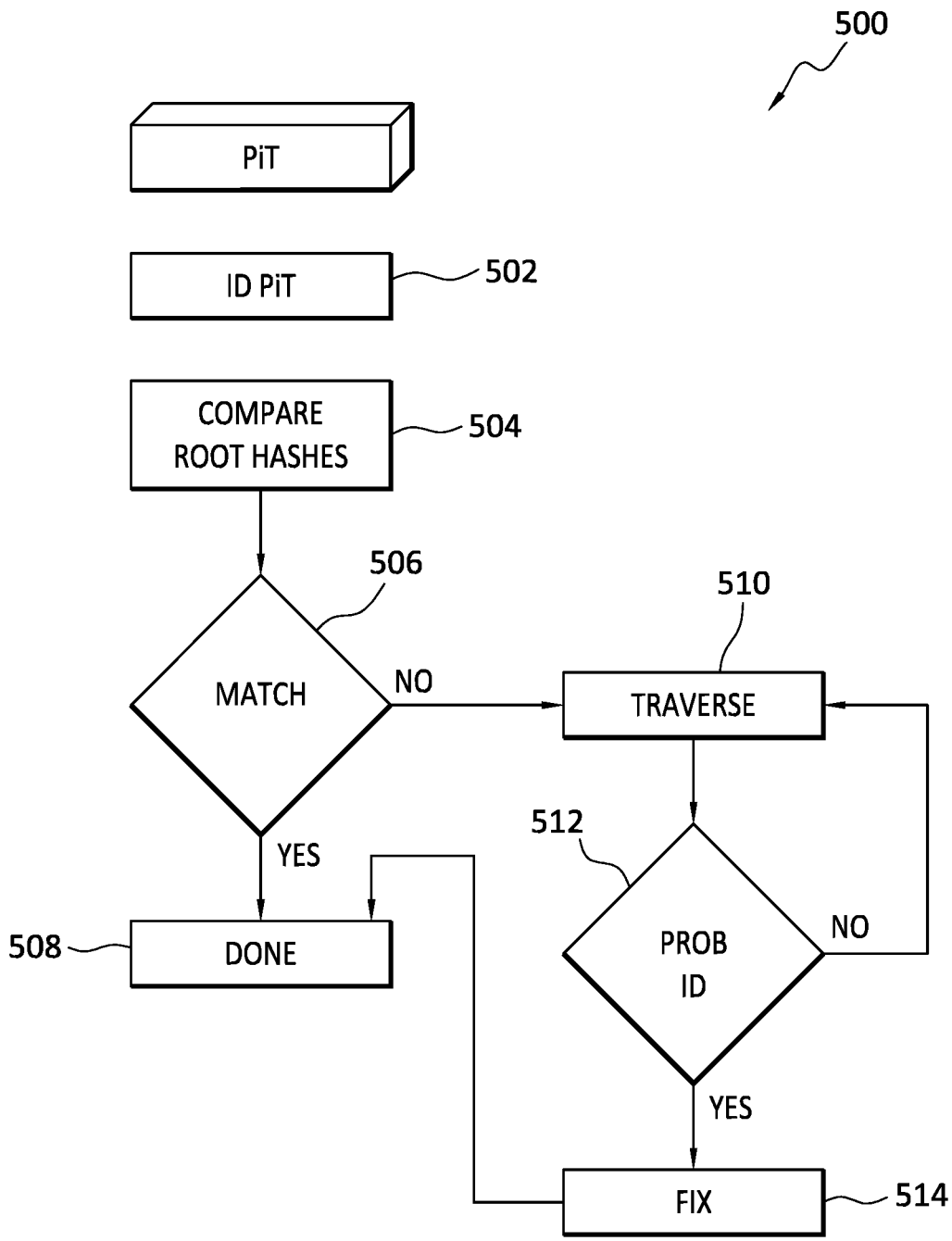
FIG. 5 discloses an example method for performing a consistency check and synchronization of trees.

At some time, there may be a need to perform a consistency check as between the source dataset and the target dataset. This may be accomplished by comparing one or more hashes of the source dataset tree with the corresponding hashes of the target dataset tree. With reference now to FIG. 5, one example method for performing a consistency check, and synchronizing datasets, is denoted generally at 500. The method 500 may be performed in whole or in part by, for example, a PiT module as disclosed herein. The PiT module may be located at a client associated with the source dataset, at a replication server, or at a data storage site. A PiT module is not required however and the functionality disclosed herein concerning consistency checks and synchronization may be performed by any entity, or distributed among a group of entities. Thus, the scope of the invention is not limited to the disclosed examples. As in the case of the method 400, the method 500 may be performed on a continuous basis, even while IOs are being issued to a source dataset and replicated to a target dataset.

The method 500 may begin with identification of a particular point in time (PiT) 502 for which it is desired to compare a source dataset tree with a target dataset tree. When the PiT has been selected 502, the respective root hashes, which both are both timestamped with the PiT, of the source dataset tree and target dataset tree are compared 504. If it is determined 506 that the root hashes match, that is, the root hashes have the same value, then no further comparison is necessary since it can be concluded that the other hashes of the two trees match as well. Thus, the method may finish 508 when it is determined that the root hashes match.

On the other hand, if it is determined 506 that the root hashes do not match, it can be concluded that there are one or more inconsistencies between the source dataset tree and the target dataset tree. Thus, the method 500 then advances and the target dataset tree is traversed 510 to the next level below the root hash in an attempt to identify an inconsistency 512. If the inconsistency is identified, it is fixed 512 and the process finishes 508. On the other hand, if no inconsistency is identified in the first traverse, the returns to 510. Thus, the processes 510 and 512 may be recursively performed until the inconsistency(ies) is/are identified and resolved 514.

E. Further Example Embodiments

Following are some further example embodiments of the invention. These are presented only by way of example and are not intended to limit the scope of the invention in any way.

Embodiment 1. A method comprising performing, while a stream of IOs is being applied to a source dataset and replicated to a target dataset, operations comprising: receiving a replicated IO that was previously applied to a source dataset tree; applying the replicated IO to a target dataset tree by entering an updated hash value in the target dataset tree; and applying a timestamp to the target dataset tree.

Embodiment 2. The method as recited in embodiment 1, wherein the source dataset tree and the target dataset tree each comprise a respective Merkle tree.

Embodiment 3. The method as recited in any of embodiments 1-2, wherein each hash in the source dataset tree, and each hash in the target dataset tree, has a respective associated timestamp.

Embodiment 4. The method as recited in any of embodiments 1-3, wherein applying a timestamp to the target dataset tree comprises associating the timestamp with a root hash of the target dataset tree.

Embodiment 5. The method as recited in any of embodiments 1-4, wherein the stream of IOs comprises one or more of a write operation, and a delete operation.

Embodiment 6. The method as recited in any of embodiments 1-5, wherein the replicated IO is a replication of an IO in the stream of IOs.

Embodiment 7. The method as recited in any of embodiments 1-6, wherein the operations further comprise applying the stream of IOs to a source volume and to a target volume.

Embodiment 8. The method as recited in any of embodiments 1-7, wherein the operations further comprise receiving, from a source, a value of a root hash of the source dataset tree.

Embodiment 9. The method as recited in any of embodiments 1-8, wherein the source dataset tree comprises hashes of data blocks stored in a source volume, and the target dataset tree comprises hashes of data blocks stored in a target volume.

Embodiment 10. The method as recited in any of embodiments 1-9, wherein the timestamp of the target dataset tree is the same as a timestamp of the most recent update to the target dataset tree.

Embodiment 11. A method comprising: comparing a root hash value of a source dataset tree with a root hash value of a target dataset tree, and both the root hash value of the source dataset tree and the root hash value of the target dataset tree have the same timestamp; determining, based on the comparing, that the target dataset tree and the source dataset tree are inconsistent with each other; traversing a portion of the target dataset tree; identifying, during the traversing, an inconsistency; and synchronizing the target dataset tree with the source dataset tree.

Embodiment 12. The method as recited in embodiment 11, wherein determining that the target dataset tree and the source dataset tree are inconsistent with each other comprises determining that the root hash of the source dataset tree and the root hash of the target dataset tree have different respective values.

Embodiment 13. The method as recited in any of embodiments 11-12, wherein traversing the target dataset tree comprises comparing a hash value of the target dataset tree with a corresponding hash value of the source dataset tree and determining that the hash value of the target dataset tree is different from the corresponding hash value of the source dataset tree.

Embodiment 14. The method as recited in any of embodiments 11-13, wherein the operations further comprising applying replicated IOs to the target dataset tree at the same time as any one or more of the comparing, determining, traversing, and synchronizing are being performed.

Embodiment 15. The method as recited in any of embodiments 11-14, wherein traversing the target dataset tree comprising comparing a hash associated with a leaf of the target dataset tree with a hash associated with a leaf of the source dataset tree.

Embodiment 16. The method as recited in any of embodiments 11-15, wherein synchronizing the source dataset tree and the target dataset tree with each other comprises resolving the inconsistency.

Embodiment 17. The method as recited in any of embodiments 11-16, wherein resolving the inconsistency comprises updating a hash value of a leaf in the target dataset tree to match a hash value of a corresponding leaf in the source dataset tree.

Embodiment 18. The method as recited in any of embodiments 11-17, wherein the operations are performed as part of a continuous replication process in which data is replicated from a source dataset to a target dataset.

Embodiment 19. A method for performing any of the operations, methods, or processes, or any portion of any of these, disclosed herein.

Embodiment 20. A non-transitory storage medium having stored therein instructions that are executable by one or more hardware processors to perform the operations of any one or more of embodiments 1-19.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
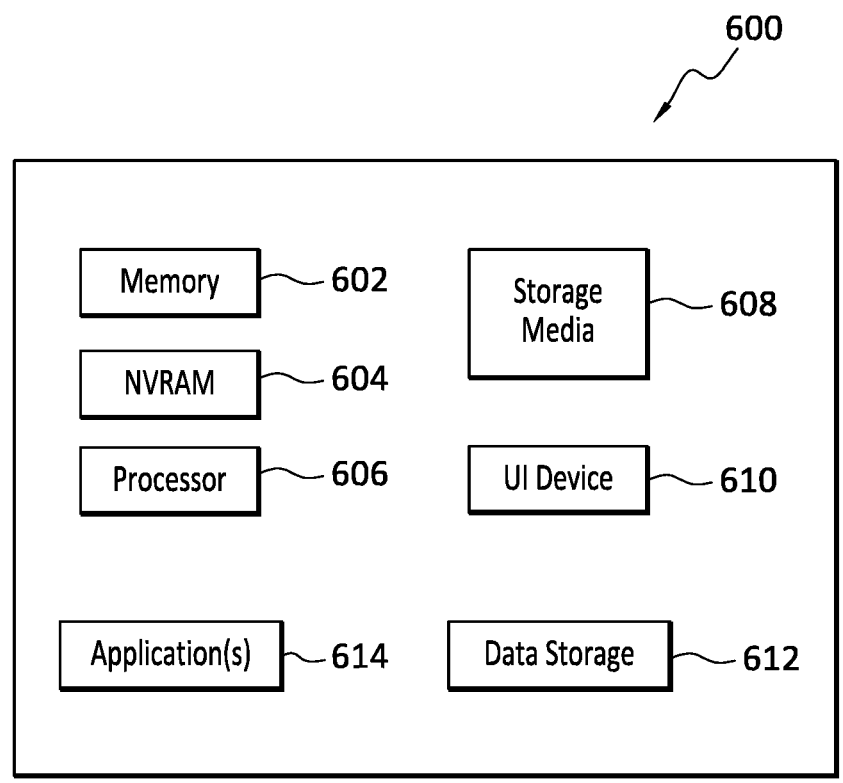
FIG. 6 discloses an example configuration of a host device.

With reference briefly now to FIG. 6, any one or more of the entities disclosed, or implied, by FIGS. 1-5 and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random access memory (RAM), non-volatile random access memory (NVRAM) 604, read-only memory (ROM), and persistent memory, one or more hardware processors 606, non-transitory storage media 608, UI device 610, and data storage 612. One or more of the memory components 602 of the physical computing device 600 may take the form of solid state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations, processes, and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A non-transitory storage medium having stored therein instructions that are executable by one or more hardware processors for:
performing, while a stream of Input/Output operations (IOs) is being applied to a source dataset at the same time as the source dataset is being replicated to a target dataset, operations comprising:
receiving a replicated IO that was previously applied to a source dataset tree;
applying the replicated IO to a target dataset tree by entering an updated hash value in the target dataset tree, wherein applying a timestamp to the target dataset tree comprises associating the timestamp with a root hash of the target dataset tree; and
applying a timestamp to the target dataset tree, wherein the timestamp is a single value; and
checking for consistency between the source dataset and the target dataset as of a specific Point-in Time (PiT).

2. The non-transitory storage medium as recited in claim 1, wherein the source dataset tree and the target dataset tree each comprise a respective Merkle tree.

3. The non-transitory storage medium as recited in claim 1, wherein each hash in the source dataset tree, and each hash in the target dataset tree, has a respective associated timestamp.

4. The non-transitory storage medium as recited in claim 1, wherein the stream of IOs comprises one or more of a write operation and a delete operation.

5. The non-transitory storage medium as recited in claim 1, wherein the replicated IO is a replication of an IO in the stream of IOs.

6. The non-transitory storage medium as recited in claim 1, wherein the operations further comprise applying the stream of IOs to a source volume and to a target volume.

7. The non-transitory storage medium as recited in claim 1, wherein the operations further comprise receiving, from a source, a value of a root hash of the source dataset tree.

8. The non-transitory storage medium as recited in claim 1, wherein the source dataset tree comprises hashes of data blocks stored in a source volume, and the target dataset tree comprises hashes of data blocks stored in a target volume.

9. The non-transitory storage medium as recited in claim 1, wherein the timestamp of the target dataset tree is the same as a timestamp of the most recent update to the target dataset tree.

10. A method, comprising:
performing, while a stream of Input/Output operations (IOs) is being applied to a source dataset at the same time as the source dataset is being replicated to a target dataset, operations comprising:
receiving a replicated IO that was previously applied to a source dataset tree;
applying the replicated IO to a target dataset tree by entering an updated hash value in the target dataset tree; and
applying a timestamp to the target dataset tree, wherein the timestamp is a single value, wherein applying a timestamp to the target dataset tree comprises associating the timestamp with a root hash of the target dataset tree; and
checking for consistency between the source dataset and the target dataset as of a specific Point-in Time (PiT).

11. The method as recited in claim 10, wherein the source dataset tree and the target dataset tree each comprise a respective Merkle tree.

12. The method as recited in claim 10, wherein each hash in the source dataset tree, and each hash in the target dataset tree, has a respective associated timestamp.

13. The method as recited in claim 10, wherein the stream of IOs comprises one or more of a write operation and a delete operation.

14. The method as recited in claim 10, wherein the replicated IO is a replication of an IO in the stream of IOs.

15. The method as recited in claim 10, wherein the operations further comprise applying the stream of IOs to a source volume and to a target volume.

16. The method as recited in claim 10, wherein the operations further comprise receiving, from a source, a value of a root hash of the source dataset tree.

17. The method as recited in claim 10, wherein the source dataset tree comprises hashes of data blocks stored in a source volume, and the target dataset tree comprises hashes of data blocks stored in a target volume.

18. The method as recited in claim 10, wherein the timestamp of the target dataset tree is the same as a timestamp of the most recent update to the target dataset tree.

* * * * *